United States Patent
Kang et al.

(10) Patent No.: US 7,261,762 B2
(45) Date of Patent: Aug. 28, 2007

(54) TECHNIQUE FOR DETECTING AND PREDICTING AIR FILTER CONDITION

(75) Inventors: Pengju Kang, Hartford, CT (US);
Mohsen Farzad, Glastonbury, CT (US);
Slaven Stricevic, Willimantic, CT (US);
Payman Sadegh, Manchester, CT (US);
Alan M. Finn, Hebron, CT (US)

(73) Assignee: Carrier Corporation, Syracuse, NY (US)

( * ) Notice: Subject to any disclaimer, the term of this patent is extended or adjusted under 35 U.S.C. 154(b) by 367 days.

(21) Appl. No.: 10/840,758

(22) Filed: May 6, 2004

(65) Prior Publication Data

US 2005/0247194 A1 Nov. 10, 2005

(51) Int. Cl.
*B01D 46/00* (2006.01)
*B01D 46/46* (2006.01)

(52) U.S. Cl. .................... 95/1; 95/14; 95/15; 95/17; 95/19; 95/23; 95/25; 95/26; 95/273; 96/417; 96/418; 96/419; 96/420; 96/421; 96/422; 96/424; 340/607; 116/DIG. 25

(58) Field of Classification Search .............. 95/1, 95/14, 15, 17, 18, 19, 23, 25, 26, 273; 96/417, 96/418, 419, 420, 421, 422, 424; 55/385.1; 165/11.1; 73/204.11; 340/603, 607; 116/DIG. 25
See application file for complete search history.

(56) References Cited

U.S. PATENT DOCUMENTS

| | | | |
|---|---|---|---|
| 4,766,553 A | 8/1988 | Kaya et al. | |
| 5,036,698 A * | 8/1991 | Conti | 116/DIG. 25 |
| 5,351,035 A | 9/1994 | Chrisco | |
| 5,429,649 A | 7/1995 | Robin | |
| 5,679,137 A | 10/1997 | Erdman et al. | |
| 5,711,785 A * | 1/1998 | Maxwell | 95/25 |
| 5,746,061 A * | 5/1998 | Kramer | 73/204.11 |
| 5,810,908 A * | 9/1998 | Gray et al. | 95/25 |
| 5,917,141 A | 6/1999 | Naquin, Jr. | |
| 6,168,646 B1 * | 1/2001 | Craig et al. | 95/19 |

(Continued)

FOREIGN PATENT DOCUMENTS

| | | |
|---|---|---|
| EP | 1 143 232 | 3/2001 |
| JP | 5296463 | 11/1993 |

OTHER PUBLICATIONS

International Search Report dated Aug. 31, 2006.

*Primary Examiner*—Jason M. Greene
(74) *Attorney, Agent, or Firm*—Carlson, Gaskey & Olds

(57) ABSTRACT

A method and system for detecting and predicting air filter condition for an air handling system operates by determining a system resistance to air flow. The system resistance is utilized to determine a detection statistic indicative of current filter condition and to predict remaining life of the air filter. The system resistance is determined using models that approximate the expected operation of the air handling system. The approximation is then compared to actual values to obtain a difference. Once the difference between the approximated value exceeds a threshold value, an alarm is initiated that is indicative of system resistance. The remaining air filter life is then determined by using historically gathered data, or by using a known degradation rate of the air filter. Once the remaining life of the air filter is estimated, replacement can be scheduled that would coincide with other maintenance.

23 Claims, 5 Drawing Sheets

U.S. PATENT DOCUMENTS

| | | |
|---|---|---|
| 6,190,442 B1 | 2/2001 | Redner |
| 6,423,118 B1 * | 7/2002 | Becerra et al. ............... 95/19 |
| 6,448,896 B1 * | 9/2002 | Bankus et al. ............. 340/607 |
| 6,471,853 B1 * | 10/2002 | Moscaritolo ................ 96/417 |
| 6,507,282 B1 | 1/2003 | Sherwood |
| 6,596,059 B1 * | 7/2003 | Greist et al. ................ 96/417 |
| 6,790,257 B2 * | 9/2004 | Jeng et al. .................... 95/19 |
| 2003/0070544 A1 * | 4/2003 | Mulvaney et al. ............ 95/25 |
| 2003/0168389 A1 * | 9/2003 | Astle et al. .................. 96/417 |
| 2006/0032379 A1 * | 2/2006 | Kates ......................... 96/417 |

* cited by examiner

TECHNIQUE FOR DETECTING AND PREDICTING AIR FILTER CONDITION

BACKGROUND OF THE INVENTION

This invention generally relates to a method of detecting air filter condition for heating, ventilating, and air conditioning systems.

Typically, an air handling system includes a filter to block and collect airborne debris. The air filter becomes blocked with usage and must be changed periodically. A blocked air filter can increase power consumption, reduce cooling and heating capacity, and cause premature component failure.

Inspection of an air filter for a large commercial air handling system can require partial dismantling of portions of the system. Dismantling the system is costly, time consuming and therefore not desirable. It is for this reason that filter detection systems have been developed.

Current filter detection devices utilize sensors installed within the air handling system that directly detect changes in airflow, temperature or other measured parameters. Further, other known devices utilize optical sensors to visually recognize a clogged filter.

Disadvantageously, prior art filter detection systems require additional sensors installed within the air handling system. The additional sensors require additional controls that increase cost and complexity. Other systems require modification to the filter for mounting of a sensor within the filter. The use of additional sensors may not be effective for systems that utilize a variable speed blower or fan. Further, known detection systems only detect, instead of predict, a clogged condition. It is preferable to replace air filters according to a predictable schedule that coincides with other periodic maintenance.

Accordingly, it is desirable to develop a system for detecting and predicting air filter condition that utilizes information presently available within the system without additional sensors that is effective for variable blower systems.

SUMMARY OF INVENTION

This invention is a method and system for detecting and predicting air filter condition for an air handling system that determines a system resistance to air flow that is utilized to determine a detection statistic indicative of current filter condition and to predict remaining life of the air filter.

The method of this invention includes determining a detection statistic based on system resistance. The system resistance is determined using models that approximate the expected operation of the air handling system. The approximation is then compared to actual values to obtain a difference. Once the difference of the approximated value exceeds a threshold value, an alarm is initiated that is indicative of system resistance. The system resistance value is indicative of the resistance to air flow provided by the entire system. The system resistance is determined by utilizing information obtained from fan speed and power, or by using known relationships between temperatures and pressure of refrigerant flowing through the heat exchanger.

This detection method provides for the optimal detection of whether or not the system resistance has surpassed the threshold value. The detection threshold is selected according to the number of samples used to calculate the average and the statistical property of the system resistance. A database of detection statistics is compiled over time to provide for the prediction of the remaining life of the air filter. The remaining air filter life is determined by using historically gathered data, or by using a known degradation rate of the air filter. Once the remaining life of the air filter is estimated, replacement can be scheduled that would coincide with other maintenance.

Accordingly, this invention provides a system for detecting and predicting air filter condition that utilizes information presently available without additional sensors that is effective for variable blower systems and that that can predict remaining air filter life.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
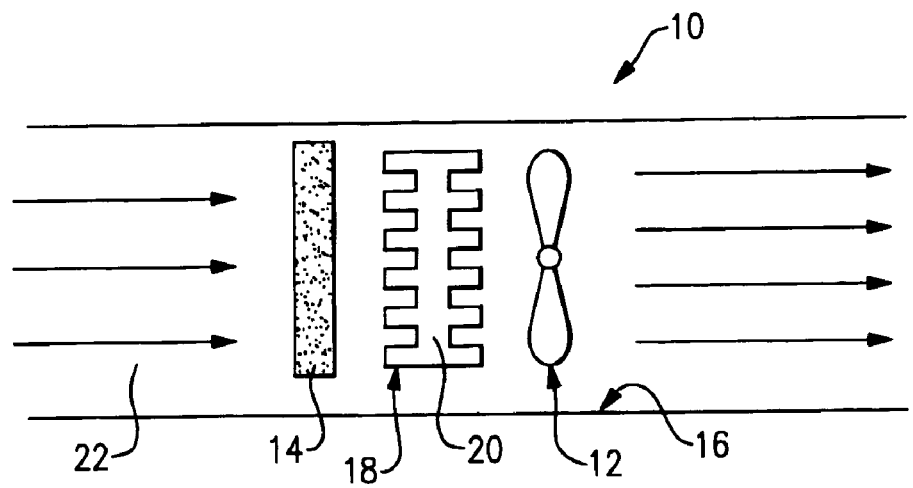
FIG. 1 is a schematic illustration of an air handling system.

A method of detecting and predicting air filter clogging for an air handling system 10 for a Heating, Venting and Air Conditioning (HVAC) system is disclosed. Referring to FIG. 1, the system 10 is schematically shown and includes a fan 12 providing airflow 22. An air filter 14, duct 16 and heat exchanger 20 having fins 18 resist the airflow 22. The condition of the filter 14 is detected by measuring system resistance to air flow 22 and determining that the air filter 14 is clogged once the system resistance reaches a predetermined value. One of ordinary skill in the art will recognize that the placement of fan 12 after heat exchanger 20 and filter 14 with respect to air flow 22 may be changed without affecting the filtering performed by filter 14 or the slow accumulation of unfiltered debris on heat exchanger 20.

Resistance to airflow 22 is caused by plugging of the air filter 14 and occurs relatively quickly compared to resistance caused by clogging of the ducts 16 or heat exchanger fins 18. Accordingly, the system resistance is regarded as being directly caused by clogging of the air filter 14. Increased system resistance increases the load on the fan 12 due to the higher pressure required to provide the desired air flow 22.

Figure 2:
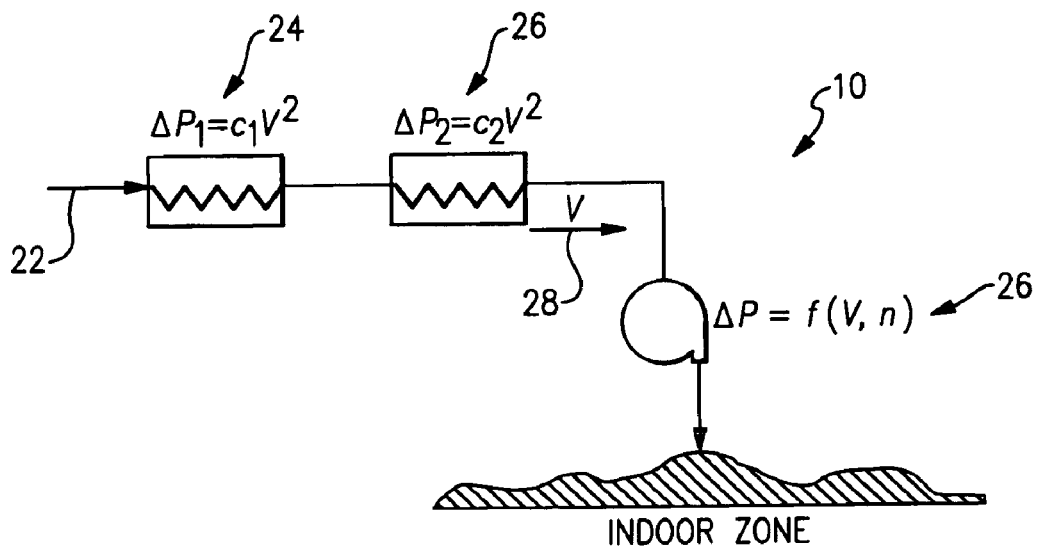
FIG. 2 is a schematic illustration of system resistance for an air-handling system.

Referring to FIG. 2, system resistance is estimated and utilized to determine a detection statistic. System resistance is a combination of air filter resistance 24, and duct and heat exchanger fin resistance 26. The combined air filter resistance 24 and duct and heat exchanger resistance 26 is used to determine the detection statistic. The detection statistic is in turn compared to a reference value. The reference value is a value of system resistance indicative of a clogged filter.

The air filter 14 is determined to be clogged responsive to the detection statistic being greater than the reference value.

Fan operating performance is defined by a fan performance curve 26 that is the relationship between pressure drop across the fan and a volumetric airflow rate. The fan performance curve is written as:

$$\Delta P = f(n, V) \quad \text{(Equation 1)}$$
$$= (a_0 + a_1 n + a_2 n^2) + (b_0 + b_1 n + b_2 n^2)V +$$
$$(k_0 + k_1 n + k_2 n^2)V^2$$

where $a_0, a_1, a_2, b_0, b_1, b_2, k_0, k_1, k_2$ are constants that can be estimated using the manufactur's data. $\Delta P$ is the pressure drop across the fan, n is the fan speed, and V is the volume flow rate of air.

A system curve describes the load characteristics of the fan 12. The system curve provides a relationship between pressure drop through the system and the volume of airflow given a known fan speed. As the airflow rate increases the resulting resistance increases rapidly such that increased pressure must be developed by the fan 12 to maintain the desired airflow. The system curve is written as:

$$\Delta P = cV^2 \quad \text{(Equation 2)}$$

where c is defined as the "resistance" of the system that includes air filter resistances ($c_1$) and the resistance of the duct and heat exchanger fins in the system ($c_2$). $\Delta P$=Pressure difference across the fan, V=volumetric flow rate.

The system resistance includes two components. The first component is the air resistance 24 caused by the air filter 14, and the second component is the resistance 26 caused by the rest of the components within the system such as the ducts, heat exchanger fins, and other components that may interfere with airflow. The resistance 24 to airflow from the air filter 14 increases much more quickly over time than the resistance 26 caused by other obstructions. Accordingly, the change in resistance of the entire system 10 provides a good approximation of the resistance produced by the air filter 14.

Figure 3:
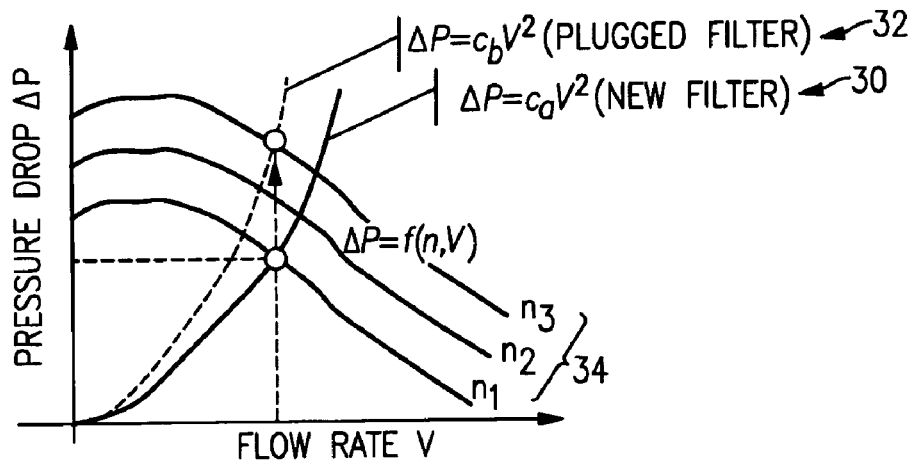
FIG. 3 is a graph illustrating the difference between a plugged and new filter.

Referring to FIG. 3, a graph illustrates the relationship between flow rate and pressure drop for a new filter 30 and a plugged filter 32 for differing fan speeds 34. A plugged filter requires increased fan speed to provide an increased pressure differential required to provide the desired airflow rate. Changing the filter 14 reduces the system resistance to airflow resulting in the ability to provide the desired flow rate at a reduced pressure differential.

Figure 4:
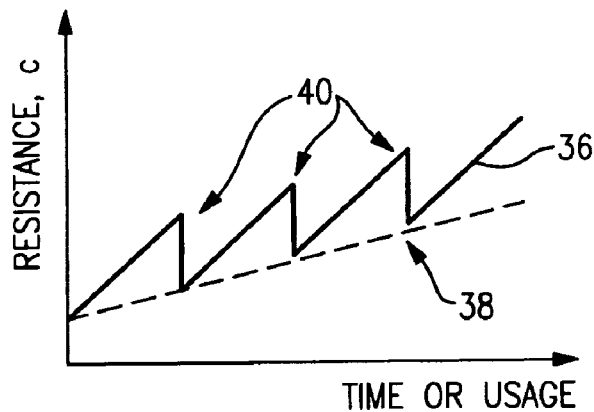
FIG. 4 is a graph illustrating the components of system resistance.

FIG. 4 is a graph that illustrates the relationship between resistance 36 caused by the air filter 14 and resistance 38 caused by the heat exchanger 20 and other components within the system 10. The resistance 36 caused by the air filter 14 increases at a much faster rate than any resistance 38 due to clogging of the heat exchanger fins 18. The method of this invention includes the step of determining a condition of the heat exchanger fins 18 based on the value of the resistance 36 immediately after replacement of the air filter 14 as indicated at 40. The abrupt decrease in system resistance that occurs once the air filter 14 has been replaced is utilized along with recorded historical data of system resistance following past similar abrupt drops in system resistance to indicate the increased resistance being contributed by the heat exchanger fins 18 and other system components.

The method of this invention utilizes system resistance to formulate a detection statistic. The detection statistic is then utilized to determine the current condition and the remaining useful life of the air filter 14. The mean value of the detection statistic fluctuates over time. Fluctuation of the detection statistic is accommodated by the use of a cumulative sum technique. The detection statistic is determined by the relationship:

$$R_n = \max(0, R_{n-1} + c_n - \mu) \quad \text{(Equation 3)}$$

where R is the detection statistic and c is the system resistance, n is the sampling interval, and $\mu$ is defined as the reference mean value of system resistance.

This detection method provides for the detection of whether or not the system resistance c has surpassed the reference value $\mu$. Depending on the sampling frequency the system resistance may be an average of multiple samples. The detection threshold is selected according to the number of samples used to calculate the average and the statistical property of the system resistance. The detection threshold is determined by numerical simulation, or from gathered data.

Once the detection threshold is set, an indication that the air filter 14 is clogged is provided by a two part test. The two part test simply compares the detection statistic to the detection threshold. If the detection statistic is greater than the detection threshold an alarm or other indication that the air filter 14 is plugged is initiated.

In some instances the detection threshold maybe exceeded due to outliers or inconsistent data points that do not reflect actual conditions, or that reflect an excessive condition for a short time caused by a random occurrence not related to system resistance. Accordingly, the method provides a counter. Each instance where the detection statistic exceeds the detection threshold is counted. Once the detection statistic is exceeded a predetermined number of times, an alarm or other indication of filter clogging is initiated. One of ordinary skill in the art will recognize that other methods of temporal smoothing or filtering could easily be used.

The detection threshold is set at a desired level depending on the time period and the desired life of the air filter. Setting the detection threshold low provides an early warning of filter plugging. This early warning initiates a prognostication routine that predicts the remaining life of the air filter in order to schedule filter replacement. The detection threshold is also set for a filter plugging alarm providing an indication of the immediate need to replace the filer. A staged alarm scheme can also be used where alarms are initiated at desired stages of filter condition.

Figure 5:
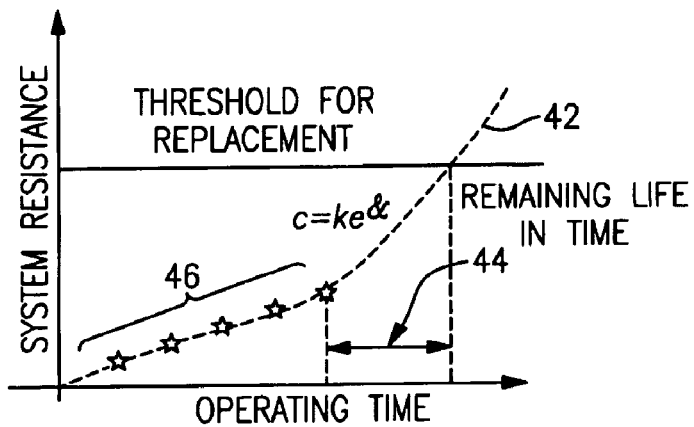
FIG. 5 is a graph illustrating the acceleration of filter clogging throughout the operating life of an air filter.

Referring to FIG. 5, to determine the remaining life of the air filter 14 it is necessary to understand how the air filter 14 degrades over time. Once clogging of the air filter 14 begins, particles are trapped at an increasing rate because openings through the air filter 14 are decreased, causing more particles to be trapped. In other words, once the air filter 14 gets clogged, even a little, it begins to trap more and more particulates that in turn accelerate clogging of the air filter 14.

In this method, historical or test data provides a relationship between operating time and system resistance utilized to determine the remaining life of the air filter 14. The relationship between operating time and system resistance is determined based on a least squares fitting technique. This actual data is used to formulate a model of air filter clogging. The model relates known and measured parameters to one another to determine a model. For example the amount of filter clogging can be related to time. Accordingly, a future amount of filter clogging is determined based on the historical data. One exemplar model for air filter condition degradation is an exponential function, in which the filter resistance is expressed as an exponential function of air filter operating time:

$$c = k e^{\sigma t} \quad \text{(Equation 4)}$$

where k and δ are two positive parameters of the exponential function, and c is the filter resistance. Once an alarm is triggered, the recent historic data of filter resistance 46 can be used to estimate the values of the two parameters in the degradation model. Subsequently with the model, the remaining useful life 44 of the air filter 14 is projected, given the threshold value for filter replacement. For those who are familiar with the art, other linear or nonlinear degradation models could be used for predicating the trajectory 42 of air filter condition degradation.

Alternatively, a statistical model is utilized to describe the degradation of the air filter 14. Due to the nature of the filter condition degradation, the actual filter resistance tends to increase monotonically along with filter operating time. For instance, the changes in the mean value of air filter resistance exhibit a monotonically increasing trend. However, the measurement estimation of filter resistance may not increase monotonically due to errors and noise in the measurement or estimation process. Because the measurement or estimation is performed at discrete times, the measured or estimated resistance may be thought of as a series of jumps that occur at discrete times.

Development of a statistical model for such a degradation might be based on prior information concerning the distribution of times between jumps in the mean of air filter resistance, the probability of an increase in the mean at a given time, and the distribution of the jump heights of the mean. The frequency of times between jumps and the height of jumps is dependent on the current point of the air filter within its useful lifespan. Because a clogged filter is prone to trapping more contaminants, jumps in resistance value are more prone to occur during later stages in the useful life of the air filter. A finite state model such as Markov Chain could be used to characterize the process of mean resistance changes. One of ordinary skill in the art will recognize that other statistical models of the degradation and finite state models of the degradation process could easily be employed.

Once the statistical model for the filter resistance change is developed, this model is used for simulations to determine the remaining life of the air filter 14 at a desired confidence level. This is accomplished, for example, by simulating an acceptable number of possible paths of the mean changes after receiving the alarm signal. With a known threshold value of filter resistance, exceeding which requires filter replacement, the remaining useful life of all the filter 14 is determined along with a confidence level, e.g. 95%, calculated corresponding to the order statistic of the simulated remaining life times. A confidence level of 50% will be obtained for the remaining life prediction, if we simply average the remaining life simulations without using the order statistic.

In air handling systems utilizing a variable speed fan, a controller 90 (FIG. 7) manages fan speed to control temperature within a desired environment. The controller 90 adjusts fan speed to provide the desired airflow and thereby provide the desired temperature. The controller 90 can be of any kind known in the art. Further, the controller 90 can be a stand alone controller dedicated to air filter clogging detection, or part of the controller managing the entire air handling system. Data indicative of fan speed and the amount of power consumed by the fan at a given fan speed is available to the controller 90. The estimation of filter resistance is determined utilizing fan speed and fan power. A relationship between fan power, difference in pressure and air flow is written as:

$$W = \frac{\Delta P V}{\eta} \quad \text{(Equation 5)}$$

where: W=fan power; ΔP=pressure drop across the fan, V=volumetric airflow rate; η=efficiency of the fan and motor.

With knowledge of fan power provided by the fan speed and power consumed by the motor from the controller 90, the fan power relationship can be substituted into Equation 1 to provide:

$$V = \frac{\eta W}{(a_0 + a_1 n + a_2 n^2) + (b_0 + b_1 n + b_2 n^2)V + (k_0 + k_1 n + k_2 n^2)V^2} \quad \text{(Equation 6)}$$

With equation 6, the volumetric flow rate can be determined utilizing the values of power and efficiency of the fan and motor. Equation 6 is solved with any commonly used nonlinear solver as is known to one skilled in the art. Once the volumetric flow rate is known, the pressure drop across the fan 12 can be determined utilizing equation 1.

Further, once the drop in pressure across the fan 12 is known, along with the volumetric flow rate V, the system resistance can be determined utilizing Equation 2.

Note that the efficiency of the fan 12 and motor 15 are assumed constant when the system curve has changed due to moderate to light air filter plugging. Once the air filter 14 becomes increasingly or heavily plugged the efficiency of the fan and motor will no longer be constant and must be calculated. The efficiency is then calculated by the equation:

$$\eta = 1 - k\left(\frac{V}{n} - k_0\right)^2 \quad \text{(Equation 7)}$$

Where k is a constant, and $k_0$ is a constant.

Figure 6:
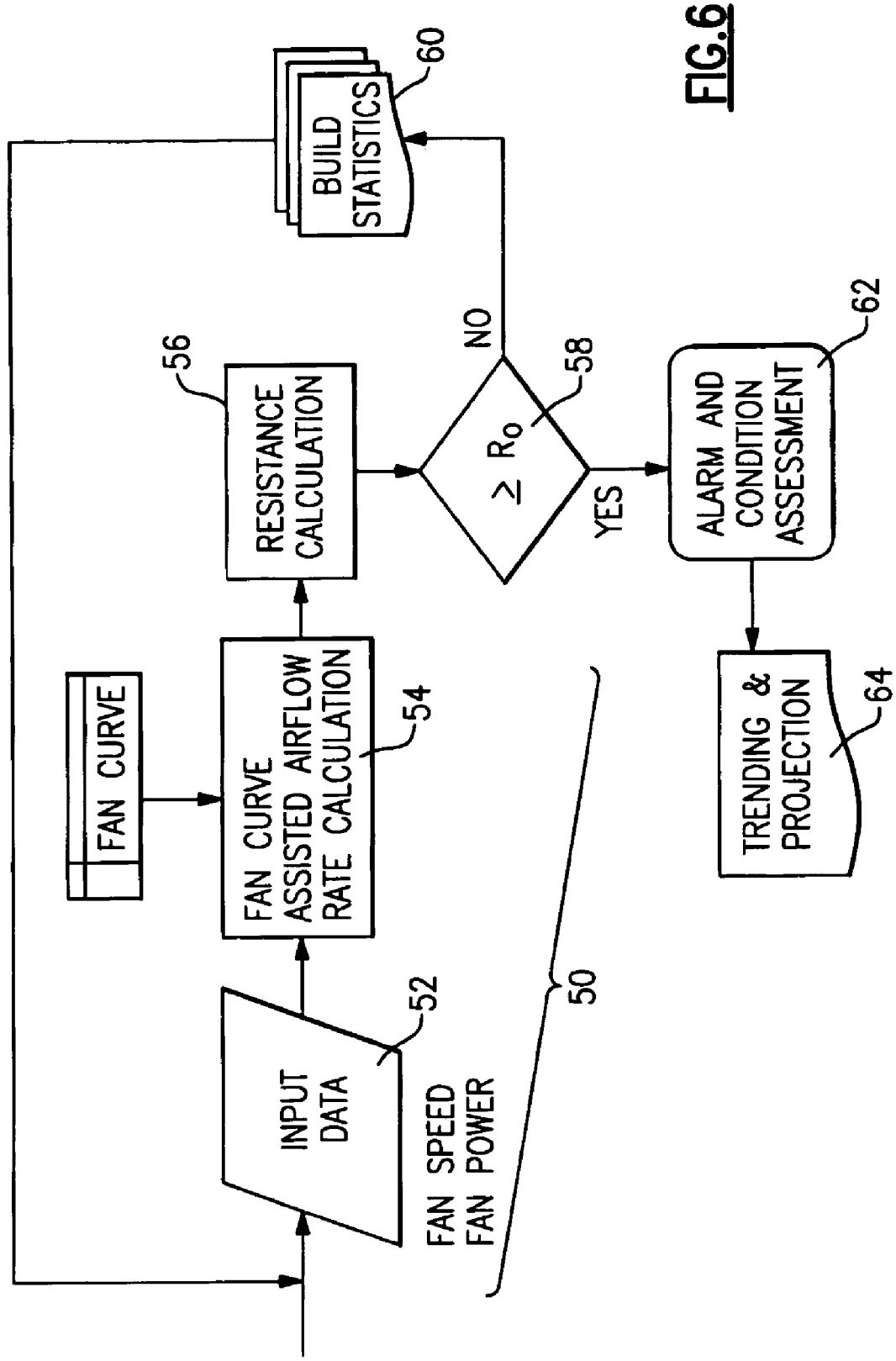
FIG. 6 a flow diagram illustrating the method of determining and predicting air filter clogging.

Referring to FIG. 6, the filter clogging detection and prediction method is shown diagrammatically and includes the initial step of estimating system resistance 50. The system resistance is determined by measuring data relating to fan speed and fan power 52. Data indicative of fan power and fan speed is available from the controller 90 for variable speed fans. The data acquisition unit of the diagnostic/prognostic device gathers a number of data samples regarding fan speed and power.

In the second step 54, the airflow rate required to deliver a desired heat exchange rate is determined by using the fan speed, and power data. The pressure drop across the fan 12 can be determined with knowledge about the air flow rate and the fan speed and power. With the pressure drop known the system resistance can be determined utilizing the system curve 56.

The detection statistic is then determined according to Equation 3. The detection statistic is then compared to a threshold value as is indicated in the decision block 58. If the detection statistic exceeds the threshold value, an alarm condition is indicated 63 and a trending process 65 is started to determine the remaining life of the air filter 14 in order to provide a time line used to plan air filter 14 replacement. If the value of the detection statistic is less then the threshold value, the value of the detection statistic is processed and used to build and improve the statistical data base 61 and then the process begins again with newly gathered data.

In some instances, data on fan operating conditions is not available. In such a case an alternate method is using to obtain a value for system resistance. The system resistance is estimated uses data indicative of system parameters such as refrigerant pressure, temperatures, actuation signals, fan speed and expansion valve control signals. The system parameter data is used in concert with a pre-stored fan curve to determine system resistance.

Figure 7:
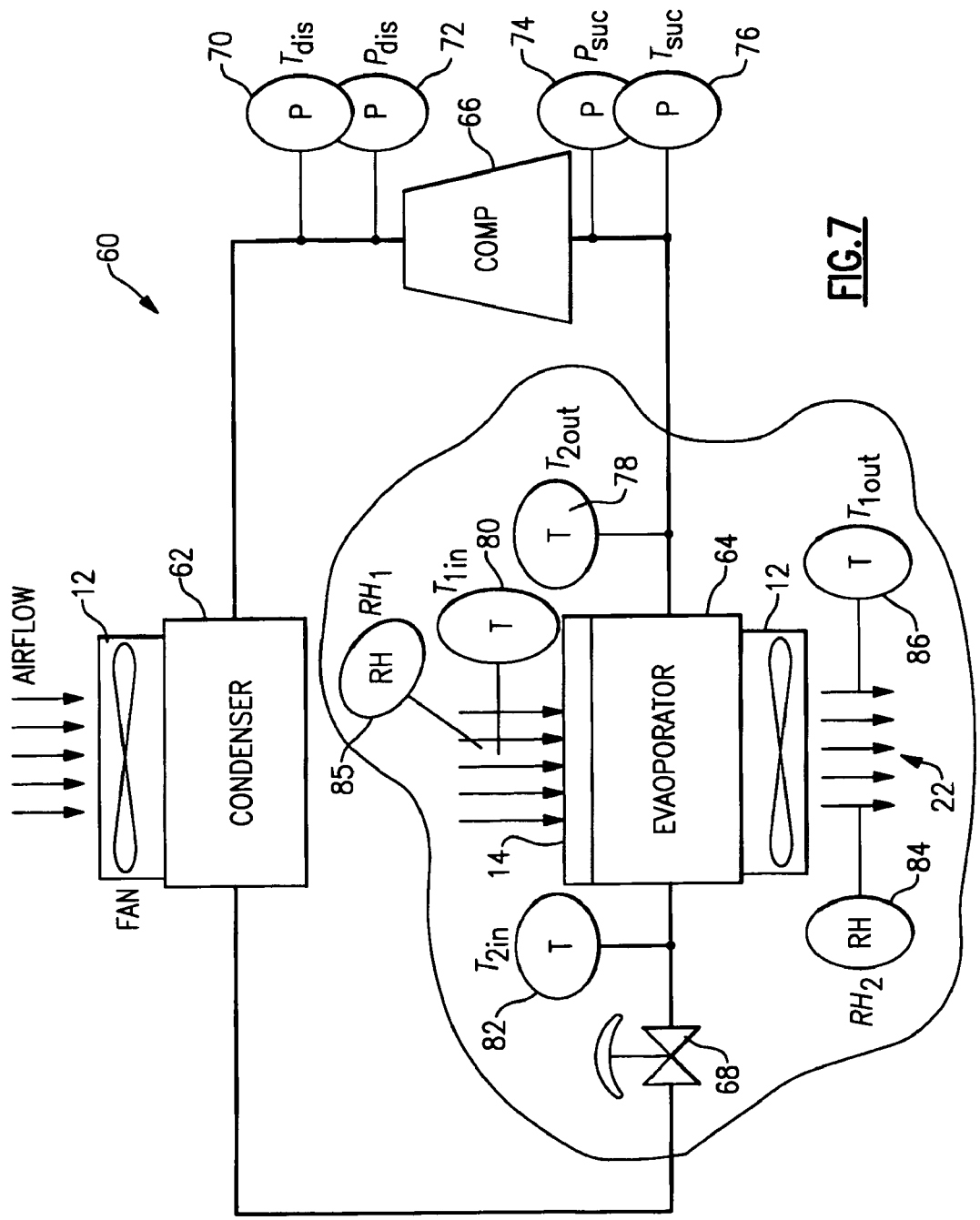
FIG. 7 is a schematic representation of a heat pump system.

Determination of a system resistance without the use of fan power requires data gathered from throughout the air handling system 10. Referring to FIG. 7, a schematic illustration of a heat pump system 60 is shown. Operation of the heat pump system 60 in cooling mode involves the circulation of refrigerant between an inside coil 64 where heat is absorbed by the refrigerant and an outside coil 62 where heat is rejected to the outside air. Heat from air passing over the inside coil 64 is absorbed by the refrigerant. The refrigerant leaves the coil 64 and is pressurized within a compressor 66. The high-pressure vapor is condensed into liquid form as it moves through the outside coil 62 where heat is rejected to the outside air. The condensed refrigerant expands through an expansion valve 68 and back to the inside coil 64. The process can be reversed to heat the inside air by absorbing heat from the outside air and rejecting that heat through the inside coil 64.

During operation of the heat pump system 60 many variables are monitored to maintain control and optimize operation. Some of the variables include the inlet and outlet temperatures of the refrigerant as obtained by sensors 82 and 78. Further, sensors 80, 86, measure inlet and outlet temperature and humidity. Sensors 70,72 and 74,76 measure pressure and temperature of refrigerant into and out of the compressor 66. These various sensors that are already present within the system 60 are used to determine the system resistance. The thermodynamic relationships between these measurements are well known and provide information used to determined the system resistance. The heat transfer equations for the heat exchanger in cooling mode are represented as:

$$Q = \frac{\dot{m}_1 c_{p1}(T_{2in} - T_{2out})}{SHR} \quad \text{(Equation 8)}$$

$$Q = UA \times \frac{(T_{1in} - T_s) - (T_{1out} - T_s)}{\log_e\left[\frac{T_{1in} - T_s}{T_{1out} - T_s}\right]} \quad \text{(Equation 9)}$$

Further the heat transfer equations for the heat exchanger in heating mode are represented as:

$$Q = \dot{m}_1 c_{p1}(T_{1in} - T_{1out}) \quad \text{(Equation 10)}$$

$$Q = UA \times \frac{(T_s - T_{1in}) - (T_s - T_{1out})}{\log_e\left[\frac{T_s - T_{1in}}{T_s - T_{1out}}\right]}$$

$$= UA \times LMTD \quad \text{(Equation 11)}$$

Where Q=rate of heat transfer;
$\dot{m}_1$=mass flow rates of air;
$c_{p1}$=specific heat of air;
U=overall heat transfer coefficient of the heat exchanger;
A=heat transfer area;
LMTD=logarithmic mean temperature difference;
$T_s$=refrigerant saturation temperature; and
SHR=sensible heat ratio.

Given the inlet and outlet temperatures of the respective fluids, the mass flow rate of air in cooling mode is calculated as:

$$\dot{m}_1 = \frac{SHR \times Q}{c_{p1}(T_{1in} - T_{1out})} \quad \text{(Equation 12)}$$

The volumetric flow rate is given as:

$$V = \frac{\dot{m}_1}{\rho_1} \quad \text{(Equation 13)}$$

where $\rho_1$ is the density of air.

The calculated volume flow rate and the fan motor speed, the pressure drop across the fan can be determined from the fan curve, after which the filter resistance can be determined. In some instances it is possible that direct measurements of air temperature exiting the heat exchanger is not available. In such cases the outlet temperature is estimated based on current operating conditions.

As appreciated, the sensible heat ratio determined for the inlet and discharge air conditions may not be known. Under stable working condition, the inlet and discharge air condition stay at a known value. If the sample data of a certain period of a day are selected for prognosis, the sensible heat ratio can be assumed to be a constant value.

Alternatively, the heat exchange rate can be calculated using the measurements of refrigerant conditions. Beginning with the equation:

$$Q = \dot{m}_2(h_{r1} - h_{r2}) \quad \text{(Equation 14)}$$

where $\dot{m}_2$=mass flow rate of refrigerant, $h_{r1}$, $h_{r2}$=specific enthalpies of refrigerant vapor at the inlet and outlet of the heat exchanger.

Refrigerant enthalpies $h_{r1}$, $h_{r2}$ can be calculated with the knowledge of refrigerant properties using the temperature and pressure measurements. Normally, direct measurement of refrigerant flow rate is not available, but can be estimated using a compressor model. The compressor model can be obtained from the manufacturer's data. A three term model that approximates the theoretical volumetric flow rate of a compressor is expressed as:

$$\dot{V}_{suc} = A - BP_R^C \quad \text{(Equation 15)}$$

where A, B, C are constants estimated from calorimeter data, and $P_R$ is the compressor pressure ratio, which is the ratio between discharge pressure ($P_{dis}$) and suction pressure ($P_{suc}$).

The compressor pressure ratio is the ratio between the discharge pressure and suction pressure and is expressed as:

$$P_R = \frac{P_{dis}}{P_{suc}} \quad \text{(Equation 16)}$$

The mass flow rate is obtained using the density of the refrigerant, $\rho_{suc}$ at the compressor suction point according to the equation:

$$\dot{m}_2 = \dot{V}_{suc} \rho_{suc} \quad \text{(Equation 17)}$$

The model is obtained for a specific value of suction superheat. However, the actual superheat may be different from that of the designed superheat. In this case the refrigerant flow rate requires correction as is indicated by the equation below:

$$\dot{m}_2 = \rho_{suc} \dot{V}_{suc} + \Delta \dot{m}_2 \quad \text{(Equation 18)}$$

$$\Delta \dot{m}_2 = \left(\frac{d\rho}{dT}\right) \Delta T \dot{V}_{suc} \quad \text{(Equation 19)}$$

Where $\Delta \dot{m}_2$=change of mass flow rate, $\Delta T$=change of vapor temperature at compressor suction point, and $$\left(\frac{d\rho}{dT}\right) = \begin{array}{l}\text{gradient of density verses changes} \\ \text{of temperature at suction point.}\end{array}$$

Refrigerant estimation using the compressor model is a feasible approach for a unitary system. More complex systems, such as multi-split modular air conditioning systems, which include many evaporators and many expansion valves, require a more detailed model. The distribution between the many evaporators and expansion valves can be estimated using the flow metering properties of the expansion valves 68.

Refrigerant flow through an expansion valve is a function of differential pressures across the valve ($\Delta P$) and the percentage of valve opening (%), which is determined by the expansion valve control signal, u. The relationship is represented by the equation:

$$\dot{m}_2 = \% \, C_v \sqrt{\Delta p} \quad \text{(Equation 20)}$$

where $C_v$ is a characteristic constant of the valve.

It is possible that a constant pressure differential valve is used for refrigerant flow regulation. In such a case there is no need for the measurement of differential pressure across the valve. Still other types of regulating valves require direct measurement or indirect estimation of the differential pressure across the valve for the purpose of flow rate calculation. If the flow rate is normalized against the pressure drop, the relationship between the normalized flow rate and the expansion valve signal can be written using a single function as shown below:

$$\frac{\dot{m}_2}{\sqrt{\Delta p}} = g(u) \quad \text{(Equation 21)}$$

where g(u) is a function of known format determined by the valve design. This function is also referred to as the valve flow-metering curve and could be obtained from the valve manufacturer or from lab tests. With the valve control signal, u, known from the system master controller, the refrigerant mass flow can be calculated using Equation 21, provided $\Delta P$ is known or constant. After knowing the refrigerant mass flow rate, the air mass flow rate could be determined using Equations 12 and 14.

Figure 8:
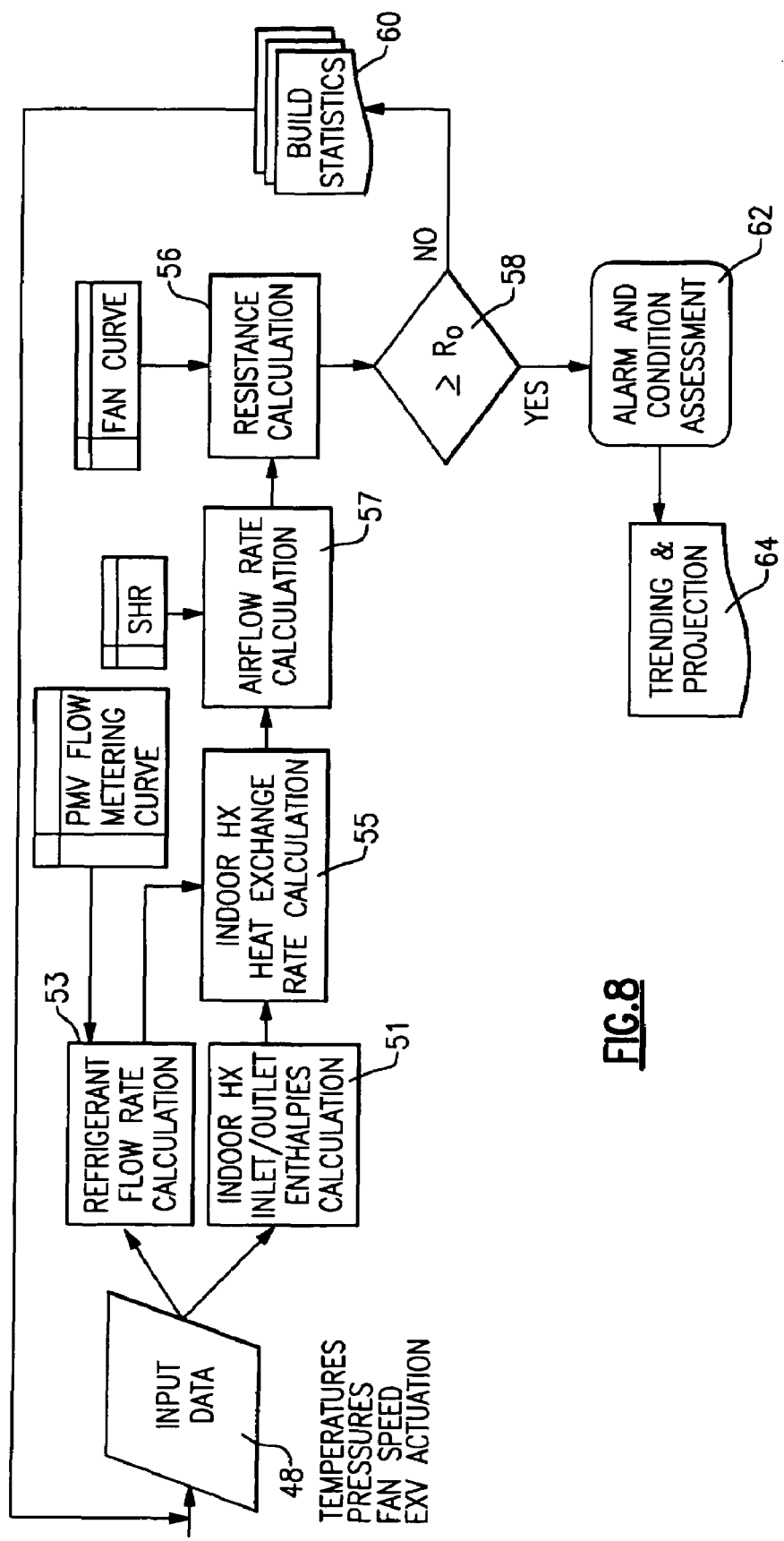
FIG. 8 is a flow diagram illustrating another method of determining and predicting air filter clogging according to this invention.

Referring to FIG. 8, the determination of system resistance progresses by determining enthalpies of refrigerant at heat exchanger inlets and outlets as indicated at 51. The enthalpies are determined using pressure and temperature data gathered from within the refrigerant loop as is shown at 48. Once the enthalpies are determined the refrigerant flow rate is obtained using the predefined expansion valve flow-metering curve as indicated at 53. The heat exchange rate of the indoor heat exchanger is computed as the enthalpy difference multiplied by the refrigerant flow rate as indicated at 55. The airflow rate required to deliver the heat exchange rate is obtained by using data indicative of air temperature difference across the heat exchanger and the sensible heat ratio is determined as is shown at 57. The system resistance calculation is accomplished by using the pre-stored known fan curve, measured fan speed, and airflow calculated in the previous calculations as indicated at 56.

The value of the system resistance is substituted into Equation 3 (shown above) to calculate the detection statistic and compare it to a threshold value as indicated by decision block and compare the detection statistic to a threshold value as indicated at 58. Once the detection statistic is determined it is compared to the threshold value and an alarm condition 63 is indicated if alarm criteria are fulfilled. Once the alarm condition 63 is indicated a trending and projection process 65 is started. If the detection statistic does not exceed the threshold value, then no alarm is indicated, and the detections statistic is combined with previously gathered information to build and improve the statistical data base 61.

The method and system of this invention provide an effective and economical detection and prediction technique for determining air filter condition. This method and system is particularly useful where fans are utilized for the transportation of cleansed and conditioned air to an indoor location. The air filter resistance is utilized as an indicator of air filter plugging. Fan manufacturer data is used to obtain a simple model for the fan performance characteristics such that deviation from that model provides an indication of air filter condition.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A method of detecting air filter clogging for an air handling system comprising the steps of:
 a) determining a system resistance utilizing a power and speed of a fan;
 b) comparing said determined system resistance to an estimated system resistance utilizing data indicative of current operating conditions; and
 c) determining that the air filter is plugged in response to said determined system resistance being greater than a threshold value.

2. The method as recited in claim 1, wherein said step a) comprises detecting a power used by a fan, and a speed of the fan.

3. The method as recited in claim 2, wherein said step a) comprises determining a flow rate through the filter.

4. The method as recited in claim 3, wherein said step a) comprises determining a pressure difference across the air filter.

5. The method as recited in claim 4, wherein said step a) comprises determining the filter resistance utilizing said determined pressure differential and flow rate.

6. The method as recited in claim 1, wherein said data comprises pressure, temperature, fan speed, and expansion valve actuation.

7. A method of detecting air filter clogging for an air handling system comprising the steps of:
   a) determining an estimated system resistance by calculating enthalpy at an inlet and outlet of a heat exchanger;
   obtaining refrigerant flow rate;
   determining heat exchange rate of the heat exchanger utilizing the refrigerant flow rate and the calculated enthalpies at the inlet and outlet of the heat exchanger;
   determining an airflow required to provide the determined heat exchange rate; and
   determining system resistance utilizing predetermined fan speed value and said determined airflow;
   b) comparing said determined system resistance to a threshold value; and
   c) determining that the air filter is plugged in response to said determined system resistance being greater than a threshold value.

8. The method as recited in claim 7, comprising the step of calculating a detection statistic value.

9. The method as recited in claim 8, wherein said step b) comprises the step of comparing said calculated detection statistic value to a threshold value and indicating that the air filter is clogged in response to said calculated detection statistic value exceeding said threshold value.

10. A method of detecting air filter clogging for an air handling system comprising the steps of:
    a) determining a system resistance comprising detecting the system resistance immediately after installation of an unclogged air filter, and determining a condition of heat exchanger fins based upon several detected system resistance values immediately following installation of an unclogged air filter;
    b) comparing said determined system resistance to a threshold value; and
    c) determining that the air filter is plugged in response to said determined system resistance being greater than a threshold value.

11. The method as recited in claim 10, comprising comparing several values of system resistance following installation of an unclogged air filter, and determining that the heat exchanger fin is fouled responsive to the system resistance following installation of an unclogged air filter exceeding a predetermined threshold value.

12. A method of predicting air filter clogging for a heating, ventilating and air conditioning system comprising the steps of:
    a) determining a system resistance value;
    b) calculating a detection statistic value utilizing according to the equation:

$$R_n = \max(0, R_{n-1} + c_n - \mu)$$

where R=the detection statistic;
    c=system resistance;
    n=sampling interval; and
    µ=reference mean value of filter resistance;

c) comparing said detection statistic value with a threshold value and indicating an alarm based on said comparison; and
    d) predicting a time fore air filter replacement base on said detection statistic.

13. A method of predicting air filter clogging for a heating, ventilating and air conditioning system comprising the steps of:
    a) determining a system resistance value including a statistical model of air filter degradation and a finite state model of the degradation process, wherein said statistical model comprises probability distributions of a time between changes in air filter degradation, a time of the air filter degradation and a magnitude of each air filter degradation change;
    b) calculating a detection statistic value utilizing said determined resistance value:
    c) comparing said detection statistic value with a threshold value and indicating an alarm based on said comparison; and
    d) predicting a time for air filter replacement based on said detection statistic.

14. The method as recited in claim 13, wherein said step of projecting the remaining life of the air filter comprises calculating a multiple probability distributions of the remaining life utilizing the model simulating degradation of the air filter to obtain a desired confidence level.

15. A system for monitoring an air handling system comprising:
    a controller for receiving data indicative of a system resistance of the air handling system, comparing the system resistance to an estimated resistance value, and determining that an air filter of the air handling system is plugged in response to the system resistance being greater than said estimated resistance value, wherein said controller receives information indicative of power and speed of a fan for determining the system resistance.

16. The system as recited in claim 15, wherein the power and speed of the fan are utilized to determine a pressure differential across said air filter.

17. The system as recited in claim 15, wherein said controller receives information indicative of current air handling system operating conditions.

18. A system for monitoring an air handling system comprising:
    A controller for receiving data indicative of a system resistance of the air handling system, comparing the system resistance to an estimated resistance value, and determining that an air filter of the air handling system is plugged in response to the system resistance being greater than said estimated resistance value, wherein said controller receives information indicative of current air handling system operating conditions and utilizes said information indicative of air handling system operating conditions to determine a heat exchange rate and a rate of airflow required to provide the determined heat exchange rate.

19. The system as recited in claim 15, comprising a plurality of sensors providing data indicative of air handling system operation.

20. The system as recited in claim 15, wherein said controller predicts a future value of said system resistance based on a statistical model of said system resistance.

21. The system as recited in claim 15, wherein said controller predicts a future value of said system resistance based on a finite state model.

22. The system as recited in claim 15, wherein said controller is separate from a controller of the air handling system.

23. The system as recited in claim 15, wherein said controller is an integral portion of a controller for the air handling system.

* * * * *